United States Patent Office 3,476,509
Patented Nov. 4, 1969

3,476,509
PRODUCTION OF WATER SOLUBLE BASIC ALUMINUM HALIDE COMPOUND
John L. Jones, North Plainfield, N.J., assignor to Armour Pharmaceutical Company, Chicago, Ill., a corporation of Delaware
No Drawing. Filed Mar. 8, 1967, Ser. No. 621,476
Int. Cl. C01f 7/48
U.S. Cl. 23—50                    10 Claims

ABSTRACT OF THE DISCLOSURE

Water soluble basic aluminum halides are prepared by reacting an aluminum halide with water and metallic aluminum in the presence of a water soluble thallium compound at a pH between 2.5 and 4.4, and at a temperature in the range of 70° C. to 105° C.

---

This invention relates to the production of water soluble basic aluminum halide compounds, and more specifically, to a method of producing such compounds in a highly pure state inexpensively and in high yield.

The basic aluminum halide compounds have found substantial commercial usages in a wide variety of fields including as astringent type body deodorants, tawing salts, and for the impregnation of textiles to impart water-repelling properties. In addition, they may also be used for the preparation of absorption agents or catalyically active substances.

The methods for preparing basic aluminum halide compounds have frequently involved the use of relatively elaborate and expensive equipment, such as equipment used for electrolysis, and/or the use of aluminum in its most expensive physical form, namely as atomized powder. Moreover, it has proved difficult to obtain these compounds in high yield in a pure state.

This invention has as an object the provision of a novel method for the preparation of basic aluminum halide compounds.

This invention has as another object the provision of a method whereby basic aluminum halide compounds may be produced in high yield, with relatively small amounts of impurities, and from relatively low cost forms of aluminum, such as aluminum ingots, without the use of expensive electrolytic equipment.

Other objects will appear hereinafter.

The foregoing objects are accomplished by the method of the present invention in which the basic aluminum halide compound is produced by reacting an aluminum halide salt, such as aluminum fluoride, aluminum chloride, aluminum bromide, or aluminum iodide with water and metallic aluminum in the presence of a water soluble thallium compound at a pH of between 2.5 and 4.4, and at an elevated temperature such as of the order of 70° C. to 105° C.

The aluminum hydroxy halides may be represented by the formula $Al_2(OH)_nX_{6-n}$, wherein $n$ is from 1 to 5, and X is fluorine, chlorine, bromine or iodine. The relative ratios of aluminum to hydroxy to halide atoms may be controlled by adjusting the concentration of the aluminum halides and/or the contact time. By way of example, starting with aluminum chloride, it is possible to substitute one hydroxyl for one of the chloride ions, or up to five chloride ions may be exchanged for the hydroxyl ions. Using a weak solution of aluminum chloride, or aluminum hydroxydichloride, and a long length of time for reaction, the product will contain a large amount of aluminum dihydroxy chloride. By way of contrast, using a highly concentrated solution of aluminum chloride and subjecting the same to contact for a short period of time, the product will consist mainly of, or entirely of, the aluminum hydroxy dichloride.

The concentration of the aluminum halide salt is not critical, and may be in the range of between 5.0 to 28.0 weight percent. Preferably for commercial usage, it should be in the range of 11.0 to 18.0 weight percent. As above-indicated, the concentration will to some degree control the type of aluminum hydroxy chloride that will be formed.

The metallic aluminum used in the present invention may be in any form, such as in ingot form or as powder, flakes, chips, sheet or the like. It is a distinct advantage of the present invention that the metallic aluminum may be used in the form of aluminum ingot, since this form is both inexpensive and avoids the inherent dust, fire and explosion hazards arising from the use of aluminum powders.

The amount of metallic aluminum employed in the process of this invention should vary from 1.5 to 8.0 times that theoretically required for the formation of the basic aluminum halide compound. By way of explanation, in the case of basic aluminum chloride, since $Al_2Cl_6$ reacts with metallic aluminum in the ratio of 1 mol of $Al_2Cl_6$ for every 5 mols of aluminum to form $$Al_2(OH)_5Cl$$

the theoretical amount of aluminum required is 5 times the amount of aluminum present in the $Al_2Cl_6$. Since the amount of metallic aluminum used in accordance with this invention will vary from 1.5 to 8.0 times the theoretical amount, the amount of aluminum required to form $Al_2(OH)_5Cl$ will be 5 times the amount of aluminum present in the $Al_2Cl_6$. For the formation of aluminum hydroxy dichloride a correspondingly reduced amount of metallic aluminum will be employed.

Thallium is used in this invention as a catalyst to enhance the formation of the desired basic aluminum halide compound. It is believed that the thallium functions to increase the dissolution rate of the metallic aluminum in the acid salt solution. While I do not wish to be bound by any theory, I believe that thallium in an acidic solution in contact with aluminum will plate out on the aluminum due to the greater solution potential of aluminum.

The action of the thallium is a true catalytic one. Thus, the maximum concentrations of thallium after plating is on the order of less than 1 part per million of thallium in a solution of the reactants. I believe that the plated thallium then creates an infinite number of galvanic cells with a very high potential difference. This causes the exposed aluminum to dissolve at a very high rate. While it is believed that the thallium functions in the above manner, it is to be understood that the present invention is not predicated on the correctness of the above theory.

The thallium may be added to the acid salt solution as either thallous or thallic cation. Metallic thallium, per se, when tested, showed no catalytic action.

The thallium compound should have a solubility of at least as great as that of thallic oxide in water, halogen acid solutions, and halogen salt solutions.

While it is possible that certain anions might adversely affect the subject process, which would lead to such thallium compounds being avoided, yet tests with the most commonly prepared thallium compounds failed to reveal the existence of any such anions. However, the identification of an anion having an adverse affect on the subject process could be achieved by any chemist having ordinary skill in the art.

Examples of suitable thallium compounds include thallous acetate, thallous carbonate, thallous nitrate, thallous sulfate, thallous chloride, thallic oxide, thallic chloride, etc. As above-indicated, the nature of the anion is not significant, so long as the thallium compound is at least as soluble as thallic oxide in water, halogen acid solutions, and halogen salt solutions.

The concentration of the thallium compound is not critical, since its function is as a catalyst. As little as of the order of .001 weight percent of thallium compound, such as in the form of thallous sulphate, may be used. Generally, the range of the thallium compound will be between .001 to .015 weight percent. Larger amounts of thallium compound may be present, but normally serve no useful purpose.

In addition to the above reagents water must be present to form the desired basic aluminum halide compound. The total amount of water present must be in excess of the amount stoichiometrically required to form the desired basic aluminum halide compound. In forming $Al_2(OH)_5Cl$ from $Al_2Cl_6$, approximately twice the amount of water is consumed in the reaction than is $Al_2Cl_6$. To maintain the solubility of the basic aluminum compound formed, it is recommended that an amount of water equal to at least about 5 times the amount of water consumed by the reaction be initially present, such as of the order of 7.6 to 56 times the amount of water consumed by the reaction.

The order of mixing the above components is not critical, but the metallic aluminum may be added last to the solution as a means for controlling the degree of reaction. While it is within the purview of this invention to commence heating of the solution in this embodiment after the introduction of the metallic aluminum, it is preferred that the solution be heated to approximately 100° C. prior to the introduction of the metallic aluminum. After introduction of the metallic aluminum, the solution is heated to boiling, that is, to a temperature slightly above 100° C. to initiate the reaction. Thereafter, the temperature of the system may be reduced to any desired value, but not lower than about 50° C., at which temperature the reaction for all commercial purposes ceases to continue. Conveniently, the temperature may be lowered to about 95° C. to reduce foaming. A temperature within the range of 70° C. to 105° C. is to be preferred for the process of the present invention.

The following examples are given to illustrate the novelty and utility of the process of this invention but without the intention of unduly limiting the scope of the invention.

EXAMPLE 1

Into a 5 liter reaction vessel equipped with a condenser were added 1,350 grams of a 32° Baumé aluminum chloride solution, 1,775 milliliters of distilled water, and 0.30 gram of thallous sulfate. The contents of the reaction vessel were then heated to about 100° C. To the clear solution was added two pieces of 99.9% aluminum ingot[1] weighing 2,529.6 grams (6.79 times the theoretical aluminum needed to form basic aluminum chloride wherein the atomic ratio of aluminum to chloride is equal to 5 to 6). The contents of the reaction vessel were then heated to about 103° C. to initiate the reaction. The temperature was then reduced to about 95° C. to control foaming. After 7.75 hours, the reaction was discontinued and the reaction vessel contents filtered to yield 3,510 grams of clear solution. An analysis of the clear solution revealed 12.5% aluminum, 8.38% chlorine, and 7.4 p.p.m. iron. During the course of the above reaction, 366.7 grams of aluminum were dissolved.

EXAMPLE 2

Using the identical reagents and amounts thereof set forth in Example 1 with the exception that no thallium compound catalyst was employed, and using the identical procedure set forth in Example 1 above with the exception that the temperature of the ingredients of the reaction vessel were maintained at a temperature of 104° C. for the entire 7.75 hours, an amount of aluminum equal to approximately 63 grams was dissolved.

EXAMPLE 3

Into a cylindrical reaction vessel equipped with a reflux condenser was added 172 grams of 99.9% aluminum granules. A solution of 397 grams of 32° Baumé $AlCl_3$ and 553 ml. $H_2O$ was heated to 70° C. and added to the vessel. The temperature of the reaction mixture was increased to boiling (about 102–103° C.), at which point dissolution of the aluminum began. The reaction was maintained at this temperature for 3.5 hours and discontinued. A total of 15.4 grams of aluminum was dissolved or 13.55% of the theoretical quantity needed to form the 5/6 basic aluminum chloride. For a more precise comparison, this can be reduced to 2.56% of theory per hour of reaction per theoretical quantity of aluminum used in the reactor.

EXAMPLE 4

0.015 gram of thallous sulfate was dissolved in 397 grams 32° Baumé $AlCl_3$ and 553 ml. water and heated to 70° C. The solution was added to a reactor containing 172 grams of granulated aluminum ingot and heated to boiling. The reaction was continued for 3.5 hours from this point. On filtering, a total of 95.5 grams of aluminum was dissolved or 16.0% of theory per hour per theoretical quantity of aluminum used.

As can be seen from a comparison of the four examples above, the amount of basic aluminum compound formed in accordance with this invention is substantially greater than the amount formed without the use of the thallium catalyst. In addition, it can be readily seen that the purity of the product obtained is substantially enhanced by the practice of the present invention. The concentration of thallium in the product of the present invention is very low, such as as low as 0.1 part per million. It would appear that the presence of the thallium compound catalyst in some manner interferes with the contamination of the basic aluminum compound by reduction of the iron ions present in the reaction vessel.

EXAMPLE 5

In a reactor containing 172 grams of granulated aluminum ingot was added a hot (70° C.) solution of 384 grams of 32° Baumé $AlCl_3$, 555 ml. $H_2O$ and 0.015 gram thallous sulfate. On heating to about 100° C., the reaction was continued for 1.25 hours, at which point the pH measured 2.8. The reaction mixture was filtered to yield 898 grams of clear solution containing 3.71% Al and 9.42% Cl (Al/Cl=0.518).

EXAMPLE 6

Example 5 was repeated exactly except that reaction was carried out for 2.0 hours, at which point the pH was 2.9. The product was filtered to yield 932 grams of clear solution assaying 5.96% Al, 9.38% Cl, Al/Cl=0.835.

EXAMPLE 7

In a reactor containing one 99.9% aluminum ingot (1276 grams) was added 798 grams of 48% hydrogen bromide in 1070 ml. $H_2O$ and the temperature slowly increased to about 100° C. The reaction became vigorous but subsided in about 0.25 hour (presumably all HBr was converted to $AlBr_3$). To the solution was added 0.115 gram thallous sulfate and the reaction again became very vigorous. After about 6.0 hours of reactivity the pH of the solution had increased to 3.55 and the reaction mixture filtered clear. Yield—2150 grams, sp. gr.=1.435; assay—11.0% Al, 16.3% Br, Al/Br=2.00.

---

[1] In each example, the aluminum ingot was Alcoa 99.9% granulated ingot consisting of flattened 7/16 inch diameter spheres, except where as in Example 7 a single large ingot was used, and in Examples 1 and 2 where two pieces of a large ingot were used.

EXAMPLE 8

In a reactor containing 142 grams of 99.9% granulated aluminum ingot was added a solution containing 300 grams of 47% hydriodic acid, 170 ml. $H_2O$ and 0.013 gram of thallous sulfate. The temperature was increased to 100° C. and reaction continued for 7.0 hours. The reaction mixture was filtered to yield 530 grams of water-white solution. Assay—3.6% Al, 30.0% iodine, Al/I=0.56.

EXAMPLE 9

Dissolved 0.030 gram of thallous acetate in 400 grams of 320 Baumé $AlCl_3$ and 550 ml. $H_2O$ and heated to 80° C. The solution was added to a reactor containing 223 grams of 99.9% granulated aluminum ingot and the mixture heated to 100° C.; reactivity started in 0.5 hour. The reaction was continued for 6.5 hours, at which point the pH was 3.6 and 113.5 grams of aluminum was dissolved. This represents a rate of 7.8% of theory per hour theoretical quantity of aluminum used. This mixture was filtered to yield 1017 grams assaying 12.85% Al, 8.60% Cl, Al/Cl=1.97.

EXAMPLE 10

A solution containing 400 grams of 32° Baumé $AlCl_3$, 550 ml. of $H_2O$ and 0.02 gram of thallous nitrate was heated to about 80° C. and added to a reactor containing 233 grams of 99.9% granulated aluminum ingot. On heating to about 100° C., reactivity became vigorous in 0.4 hour. The reaction was continued for 5.8 hours, at which point the solution pH was 3.5 and 109.6 grams of aluminum was dissolved. This represents a reactivity rate of 8.1% of theory per hour per theoretical quantity of aluminum used. The mixture was filtered to yield 1027 grams of product assaying 12.50% Al, 8.62% Cl, Al/Cl=1.91.

EXAMPLE 11

0.02 gram of thallous chloride was dissolved in 50 ml. of water, saturated the solution with chlorine gas and stored in a dark container for about 15 hours. The solution was resaturated with chlorine gas prior to use to assure the presence of thallic chloride.

In a reactor containing 233 grams of granulated aluminum ingot was added a solution of 400 grams of 32° Baumé $AlCl_3$ and 500 ml. of $H_2O$ heated to 80° C. The solution of thallic chloride was added and the mixture heated to 100° C. From the time reactivity started, the reaction was continued for 6.75 hours, at which point 115.0 grams of aluminum had dissolved. This represents a reactivity of 7.3% of theory per hour per theoretical quantity of aluminum used. The reaction mixture was filtered to yield 1025 grams of product assaying 13.05% Al, 8.88% Cl, Al/Cl=1.93.

The basic aluminum halide compound derived by the method of the present invention is, as above noted, in a high state of purity, and relatively free from iron. Moreover, it may be formed using the simplest of equipment, with no need for electrolysis equipment, and with the metallic aluminum added in the ingot state. The yields of basic aluminum halide compound from the process of the present invention are very high, and the rate of reaction is, as a comparison of Examples 1 and 2 will show, far higher than a process in which the thallium compound catalyst of the present invention is not used.

The present invention may be embodied in other specific forms without departing from the spirit or essential attributes thereof and, accordingly, reference should be made to the appended claims, rather than to the foregoing specification as indicating the scope of the invention.

I claim:
1. A process for producing water soluble basic aluminum halide compound of the formula:

$$Al_2(OH)_nX_{6-n}$$

where X is a halide selected from the group consisting of fluorine, chlorine, bromine, and iodine, and $n$ is from 1 to 5, which comprises reacting a mixture of aluminum halide, a stoichiometric excess of water over the amount consumed in the reaction, and a stoichiometric excess of metallic aluminum over the amount consumed in the reaction in the presence of from 0.001 to 0.015 weight percent of a thallium compound which is at least as soluble as thallic oxide in water, halogen acid solutions, and halogen salt solutions, at a pH of between 2.5 to 4.4, and a temperature of about 50° C. to 105° C. to form an aqueous solution of the basic aluminum halide.

2. The process of claim 1 wherein the aluminum salt is $Al_2Cl_6$.

3. The process of claim 1 wherein the thallium compound is thallous sulfate.

4. The process of claim 1 wherein the thallium compound is thallous nitrate.

5. The process of claim 1 wherein the thallium compound is thallous acetate.

6. The process of claim 1 wherein the thallium compound is thallic oxide.

7. The process of claim 1 wherein the temperature is between 70° C. to 105° C.

8. The process of claim 1 in which the aluminum halide is initially present in a concentration of 5.0 to 28.0 weight percent, and the amount of metallic aluminum is initially present from 1.5 to 8.0 theoretically required for the formation of the desired basic aluminum halide compound.

9. The process of claim 1 wherein the amount of water initially present is at least about 5 times the amount of water consumed by the reaction.

10. A process for producing water soluble basic aluminum halide compound of the formula:

$$Al_2(OH)_nX_{6-n}$$

wherein X is a halide selected from the group consisting of fluorine, chlorine, bromine, and iodine, and $n$ is from 1 to 5, which comprises reacting a mixture of about 10.0 to 18.0 weight percent of aluminum halide, about 7.6 to 56 times the amount of water consumed in the reaction, and about 1.5 to 8.0 times the amount of metallic aluminum theoretically required for the formation of the desired basic aluminum halide compound in the presence of from 0.001 to 0.015 weight percent of a thallium compound which is at least as soluble as thallic oxide in water, halogen acid solutions, and halogen salt solutions at a pH of between 2.5 to 4.4, and a temperature of between about 70° C. to 105° C. to form an aqueous solution of the basic aluminum halide.

References Cited

UNITED STATES PATENTS

| | | | |
|---|---|---|---|
| 2,196,016 | 4/1940 | Huehn et al. | 23—92 |
| 2,915,475 | 12/1959 | Bugosh. | |
| 3,006,724 | 10/1961 | Harrell | 23—88 |

FOREIGN PATENTS

| | | |
|---|---|---|
| 150,410 | 3/1953 | Australia. |

OTHER REFERENCES

Tanabe: "American Perfumer and Cosmetics," vol. 77, August 1962, pp. 25–30.

HERBERT T. CARTER, Primary Examiner

U.S. Cl. X.R.

23—88, 92